(12) United States Patent
Uchiyama

(10) Patent No.: US 8,730,381 B2
(45) Date of Patent: May 20, 2014

(54) IMAGE PICKUP SYSTEM, CAMERA AND INTERCHANGEABLE LENS

(75) Inventor: Minoru Uchiyama, Utsunomiya (JP)

(73) Assignee: Canon Kabushiki Kaisha (JP)

(*) Notice: Subject to any disclaimer, the term of this patent is extended or adjusted under 35 U.S.C. 154(b) by 318 days.

(21) Appl. No.: 13/209,516

(22) Filed: Aug. 15, 2011

(65) Prior Publication Data

US 2012/0044409 A1    Feb. 23, 2012

(30) Foreign Application Priority Data

Aug. 19, 2010 (JP) ................. 2010-183935

(51) Int. Cl.
*H04N 5/225* (2006.01)
*G03B 13/22* (2006.01)
*G02B 15/14* (2006.01)

(52) U.S. Cl.
USPC .................. 348/360; 396/91; 359/683

(58) Field of Classification Search
USPC ............ 348/240.99, 240.3, 357, 360; 396/82, 396/91, 93; 359/683, 684, 685
See application file for complete search history.

(56) References Cited

U.S. PATENT DOCUMENTS

| | | | | |
|---|---|---|---|---|
| 5,398,064 A | * | 3/1995 | Saka ............................ | 348/347 |
| 5,587,739 A | * | 12/1996 | Suzuki et al. ................ | 348/347 |
| 7,463,426 B2 | * | 12/2008 | Nishio ......................... | 359/683 |
| 8,526,806 B2 | * | 9/2013 | Kikuchi ........................ | 396/91 |
| 2012/0008037 A1 | * | 1/2012 | Yamanaka .................... | 348/345 |
| 2012/0120303 A1 | * | 5/2012 | Yamanaka .................... | 348/347 |
| 2013/0010373 A1 | * | 1/2013 | Abe et al. ...................... | 359/698 |

FOREIGN PATENT DOCUMENTS

| | | | |
|---|---|---|---|
| JP | 63-087871 A | | 4/1988 |
| JP | 04-076508 A | | 3/1992 |
| JP | 2008118199 A | * | 5/2008 |
| JP | 2008129455 A | * | 6/2008 |

OTHER PUBLICATIONS

Japanese Office Action issued in Japanese counterpart application No. JP2010-183935, dated Mar. 25, 2014.

* cited by examiner

*Primary Examiner* — John Villecco
(74) *Attorney, Agent, or Firm* — Rossi, Kimms & McDowell LLP

(57) ABSTRACT

The image pickup system includes a camera and an interchangeable lens having an image-taking optical system. The camera includes an image sensor to photoelectrically convert an object image formed by the image-taking optical system and to be moved in an optical axis direction, and a camera controller configured to control movement of the image sensor such that focus variation caused due to variation of magnification of the interchangeable lens is reduced. The camera controller is configured to acquire image sensor moving data corresponding to the interchangeable lens attached to the camera, and controls the movement of the image sensor by using the image sensor moving data.

15 Claims, 4 Drawing Sheets

IMAGE PICKUP SYSTEM, CAMERA AND INTERCHANGEABLE LENS

BACKGROUND OF THE INVENTION

1. Field of the Invention

The present invention relates to an image pickup system capable of performing zoom tracking control by moving an image sensor, particularly to a lens-interchangeable image pickup system.

2. Description of the Related Art

Image-taking optical systems, which are capable of performing variation of magnification by moving a magnification-varying lens and in which the variation of magnification causes image plane variation, move a compensating lens (for example, a focus lens) other than the magnification-varying lens in an optical axis direction so as to compensate for the image plane variation to maintain an in-focus state. Control of such movement of the compensating lens for compensating for the image plane variation caused due to the variation of magnification is referred to as "zoom tracking (or zoom tracking control)".

Japanese Patent Laid-Open No. 63-087871 discloses a camera that moves, in addition to the movement of the compensating lens, an image sensor, which photoelectrically converts an object image, in the optical axis direction to compensate for the image plane variation. Performing zoom tracking that moves the image sensor with the movement of the compensating lens enables reduction of a movable range required for the compensating lens, which makes it possible to miniaturize the camera.

However, in order to realize the zoom tracking by the movement of the image sensor in a lens-interchangeable image pickup system including a camera and an interchangeable lens to be attached thereto, the following problem should be solved. The problem is that, in a case where the camera performs the movement control of the image sensor according to the variation of magnification in the interchangeable lens, the camera should perform appropriate movement control of the image sensor according to an optical configuration and an optical characteristic of the interchangeable lens. Inappropriate movement control of the image sensor makes it impossible to obtain a good zoom tracking result.

SUMMARY OF THE INVENTION

The present invention provides an image pickup system capable of performing appropriate movement control of the image sensor for the zoom tracking even when various interchangeable lenses are attached to the camera.

The present invention provides as one aspect thereof an image pickup system including a camera and an interchangeable lens to be detachably attached to the camera. The interchangeable lens has an image-taking optical system that includes a magnification-varying lens being moved in an optical axis direction to perform variation of magnification and a compensating lens being moved in the optical axis direction to reduce focus variation caused due to the variation of magnification. The camera includes an image sensor configured to photoelectrically convert an object image formed by the image-taking optical system, an image sensor driver configured to move the image sensor in the optical axis direction, and a camera controller configured to control movement of the image sensor through the image sensor driver such that the focus variation caused due to the variation of magnification of the image-taking optical system is reduced. The camera controller is configured to acquire image sensor moving data corresponding to the interchangeable lens attached to the camera, and controls the movement of the image sensor by using the image sensor moving data.

The present invention provides as another aspect thereof a camera to which an interchangeable lens is detachably attached, the interchangeable lens having an image-taking optical system that includes a magnification-varying lens being moved in an optical axis direction to perform variation of magnification and a compensating lens being moved in the optical axis direction to reduce focus variation caused due to the variation of magnification. The camera includes an image sensor configured to photoelectrically convert an object image formed by the image-taking optical system, an image sensor driver configured to move the image sensor in the optical axis direction, and a camera controller configured to control movement of the image sensor through the image sensor driver such that the focus variation caused due to the variation of magnification of the image-taking optical system is reduced. The camera controller is configured to acquire image sensor moving data corresponding to the interchangeable lens attached to the camera, and controls the movement of the image sensor by using the image sensor moving data.

The present invention provides as still another aspect thereof an interchangeable lens to be detachably attached to a camera. The interchangeable lens includes an image-taking optical system including a magnification-varying lens being moved in an optical axis direction to perform variation of magnification and a compensating lens being moved in the optical axis direction to reduce focus variation caused due to the variation of magnification. The camera includes an image sensor configured to photoelectrically convert an object image formed by the image-taking optical system, an image sensor driver configured to move the image sensor in the optical axis direction, and a camera controller configured to control movement of the image sensor through the image sensor driver such that the focus variation caused due to the variation of magnification of the image-taking optical system is reduced by using image sensor moving data corresponding to the interchangeable lens attached to the camera. The interchangeable lens sends, in response to a requirement from the camera controller, the image sensor moving data corresponding to the interchangeable lens to the camera controller.

Further features of the present invention will become apparent from the following description of exemplary embodiments with reference to the attached drawings.

DESCRIPTION OF THE PREFERRED EMBODIMENTS

Exemplary embodiments of the present invention will hereinafter be described with reference to the accompanying drawings.

Figure 1:
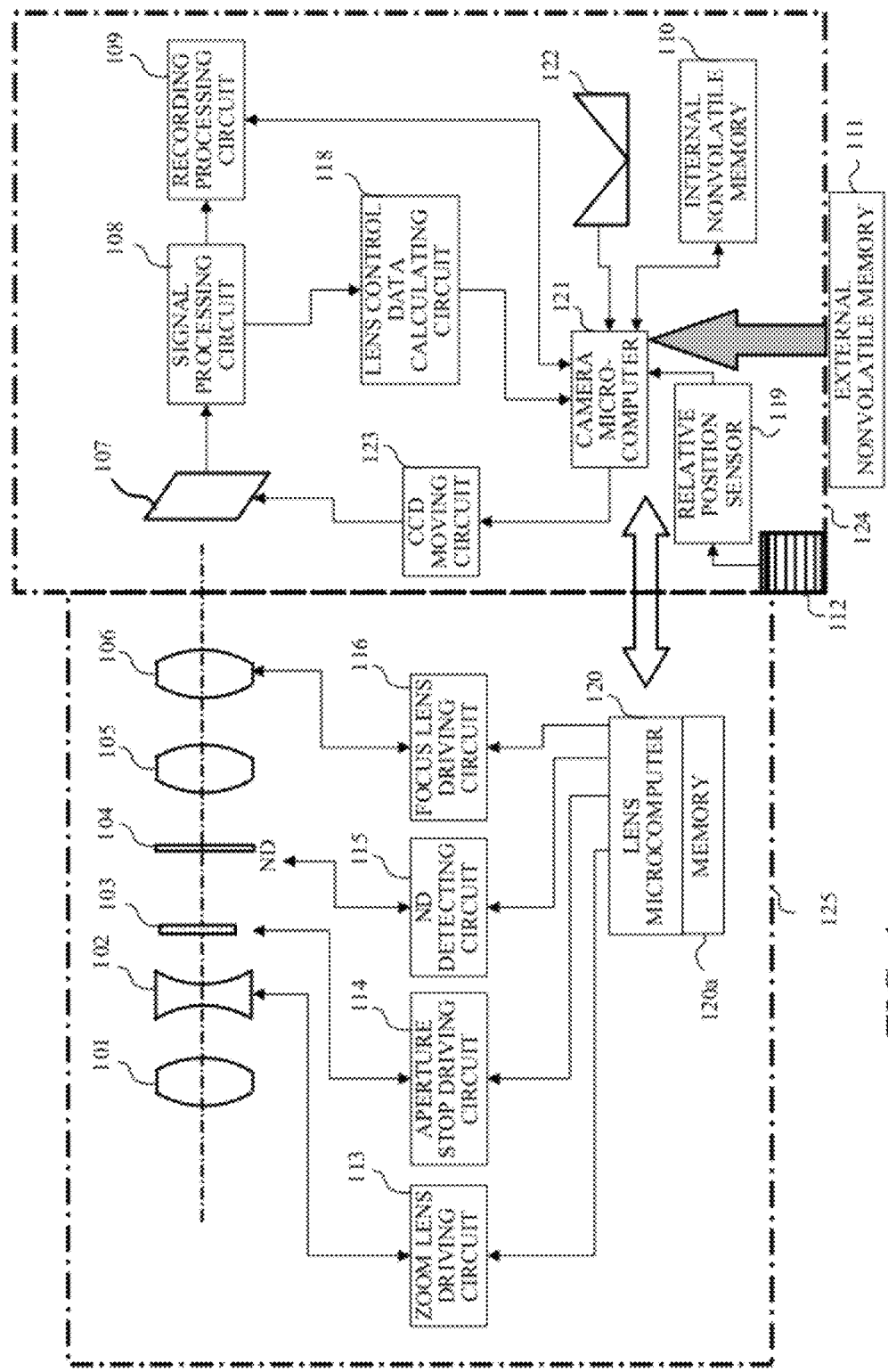
FIG. 1 is a block diagram showing the configuration of a lens-interchangeable image pickup system that is an embodiment of the present invention.

FIG. 1 shows the configuration of a lens-interchangeable image pickup system that is an embodiment of the present invention. The image pickup system is constituted by an image pickup unit (hereinafter referred to as a "camera") 124 and an interchangeable lens unit 125 interchangeable with respect to (detachably attached to) the camera 124. The interchangeable lens unit 125 is one of interchangeable lens units having mutually different optical configurations and mutually different optical characteristics.

Light from an object (not shown) enters an image-taking optical system in the interchangeable lens unit 125. The image-taking optical system includes, in order from an object side, a fixed front lens 101, a magnification-varying lens 102 that is moved in an optical axis direction to perform variation of magnification, an aperture stop 103 that adjusts a quantity of light passing therethrough, and an ND filter 104 that decreases the quantity of the light passing through the aperture stop 103. In addition, the image-taking optical system includes a fixed intermediate lens 105, and a focus lens 106 that is moved in the optical axis direction to perform focusing. The focus lens 106 also serves as a compensating lens that is moved in the optical axis direction to compensate for focus variation, in other words, image plane variation caused due to the variation of magnification of the image-taking optical system.

The light that has entered the image-taking optical system forms an object image on an image sensor (image pickup element) 107 such as a CCD sensor or a CMOS sensor installed in the camera 124. The image sensor 107 is hereinafter referred to as a "CCD 107".

In the camera 124, the CCD 107 photoelectrically converts the object image into an image-pickup signal as an electrical signal. The image-pickup signal is sent to a signal processing circuit 108. The signal processing circuit 108 performs various signal processes, such as amplification, on the image-pickup signal to produce a digital video signal. In addition, the signal processing circuit 108 performs various video processes, such as a color correction process and a white balance process, on the digital video signal to output the processed video signal to a recording processing circuit 109. The recording processing circuit 109 records the video signal output from the signal processing circuit 108 to a recording medium such as a semiconductor memory.

Moreover, the video signal is sent from the signal processing circuit 108 also to a lens control data calculating circuit 118. The lens control data calculating circuit 118 produces from the video signal a luminance signal and an AF evaluation value signal respectively necessary for auto exposure and auto focus, and sends these luminance signal and AF evaluation value signal to a camera microcomputer 121 serving as a camera controller.

The camera microcomputer 121 controls, based on the luminance signal showing luminance of the video signal (that is, luminance of the object), an photoelectric conversion operation of the CCD 107, and sends an aperture stop command signal to a lens microcomputer 120 installed in the interchangeable lens unit 125 through communication therewith. Moreover, the camera microcomputer 121 sends, based on the AF evaluation value signal showing a contrast state of the video signal, an AF command signal to the lens microcomputer 120 serving as a lens controller.

In addition, the camera microcomputer 121 detects a user's operation of a zoom switch 122 to send a zoom command signal to the lens microcomputer 120. Moreover, the camera microcomputer 121 detects a user's operation of a manual focus operation unit 112 through a relative position sensor 119 to send a manual focus command signal to the lens microcomputer 120.

The lens microcomputer 120 operates the aperture stop 103 through an aperture stop driving circuit 114, in response to the aperture stop command signal, to change an aperture diameter of the aperture stop 103. The aperture stop driving circuit 114 includes, though not shown, an aperture stop actuator such as a stepping motor, and an aperture stop position detector that detects an aperture position (aperture diameter) of the aperture stop 103.

Moreover, the lens microcomputer 120 detects whether or not the ND filter 104 is disposed inside an optical path, through an ND detecting circuit 115, and changes the aperture diameter of the aperture stop 103 according to the detection result. The ND filter 104 can be inserted in and removed from the optical path according to a user's operation.

Furthermore, the lens microcomputer 120 moves, in response to the AF command signal or the manual focus command signal, the focus lens 106 in the optical axis direction through a focus lens driving circuit 116 to perform AF (auto focus) or manual focus. The focus lens driving circuit 116 includes, though not shown, a focus actuator such as a stepping motor or a voice coil motor, and a focus position detector that detects a position of the focus lens 106 (hereinafter referred to as a "focus position") in the optical axis direction.

In addition, the lens microcomputer 120 moves, in response to the zoom command signal, the magnification-varying lens 102 in the optical axis direction through a zoom lens driving circuit 113 to perform the variation of magnification (zooming). The zoom lens driving circuit 113 includes, though not shown, a zoom actuator such as a stepping motor, and a zoom position detector that detects a position of the magnification-varying lens 102 (hereinafter referred to as a "zoom position") in the optical axis direction. In the zooming, the lens microcomputer 120 moves the focus lens 106 in the optical axis direction through the focus lens driving circuit 116 to reduce (compensate for) the focus variation caused due to the variation of magnification.

Such movement control of the focus lens 106 for compensating for the focus variation caused due to the variation of magnification is hereinafter also referred to as "focus zoom tracking" in order to distinguish it from movement control of the focus lens 106 for AF.

Moreover, the lens microcomputer 120 sends, to the camera microcomputer 121, a CCD movement command signal to cause the camera microcomputer 121 to move the CCD 107 in the optical axis direction for compensating for the focus variation caused due to the variation of magnification. The camera microcomputer 121 moves, in response to the CCD movement command signal, the CCD 107 in the optical axis direction through a CCD moving circuit (image sensor driver) 123.

The CCD moving circuit 123 includes, though not shown, a CCD actuator such as a stepping motor or a voice coil motor, and a CCD position detector that detects a position of the CCD 107 (hereinafter referred to as a "CCD position") in the optical axis direction.

Such movement control of the CCD 107 for compensating for the focus variation caused due to the variation of magnification is hereinafter also referred to as "CCD zoom tracking". Furthermore, the movement control of the focus lens 106 and CCD 107 for compensating for the focus variation caused due to the variation of magnification is hereinafter collectively referred to as "zoom tracking".

Figure 2:
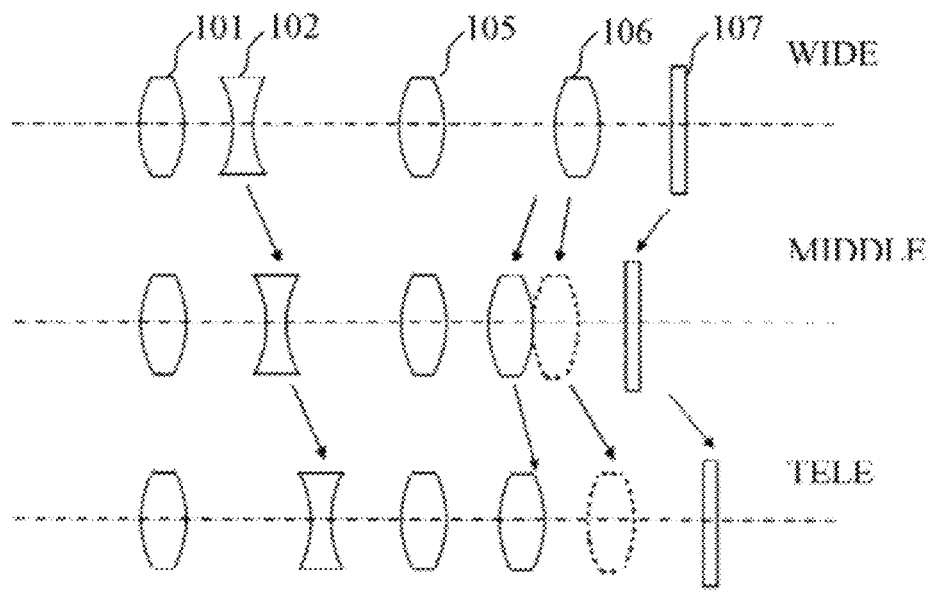
FIG. 2 shows a relationship among a zoom position, a focus position and a CCD position in the image pickup system of the embodiment.

FIG. 2 shows a relationship among the zoom position (a wide-angle end, a middle zoom position and a telephoto end), the focus position and the CCD position in the zoom tracking. Moving the focus lens 106 and the CCD 107 in the optical axis direction as shown by arrows according to change of the zoom position enables prevention of image blur (focus variation) due to the variation of magnification (in other words, enables maintenance of an in-focus state during zooming). In FIG. 2, the CCD positions for the respective zoom positions (focal lengths) are fixed regardless of object distance (in-focus position of the focus lens 106) as later shown in FIGS. 3 and 4. However, the focus position for the zoom tracking is changed according to the object distance as shown by solid lines and dotted lines.

Figure 3:
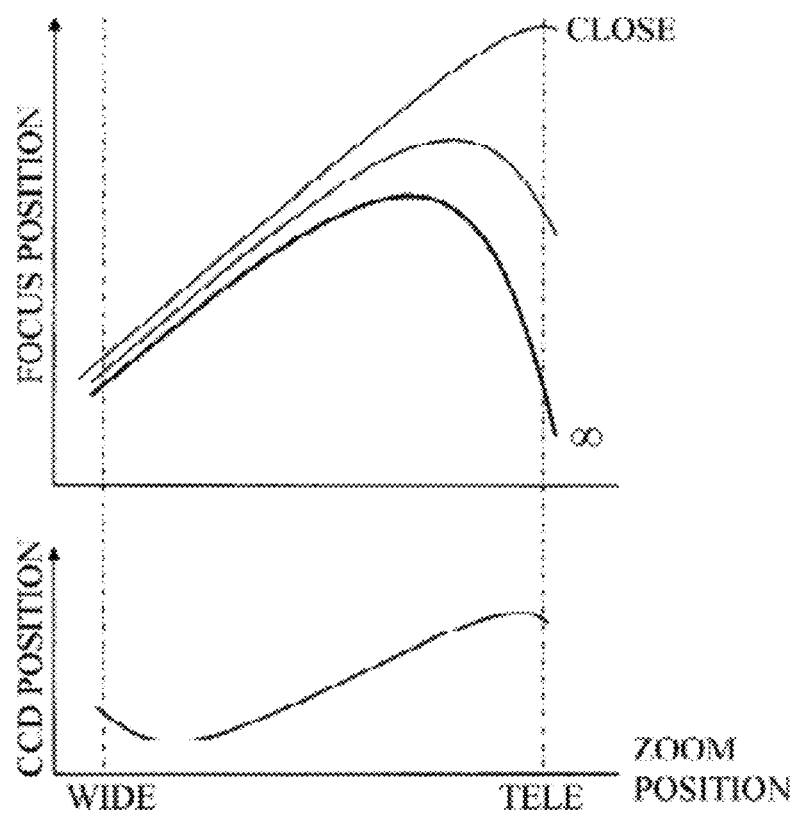
FIG. 3 shows relationships among the zoom position, the focus lens position and the CCD position in the image pickup system of the embodiment, when a first interchangeable lens is used in the image pickup system.

FIG. 3 shows relationships among the zoom position, the focus position and the CCD position when the interchangeable lens unit 125 attached to the camera 124 is a first interchangeable lens unit. Data group showing the relationship between the zoom position and the focus position is referred to as "focus zoom tracking cam data (compensating lens moving data)". Moreover, data group showing the relationship between the zoom position and the CCD position is referred to as "CCD zoom tracking cam data (image sensor moving data)".

The focus zoom tracking cam data and the CCD zoom tracking cam data shown in FIG. 3 are data corresponding to, that is, unique to the first interchangeable lens unit. In addition, the CCD zoom tracking cam data is data corresponding (unique) to a combination of the first interchangeable lens unit and the camera 124.

Figure 4:
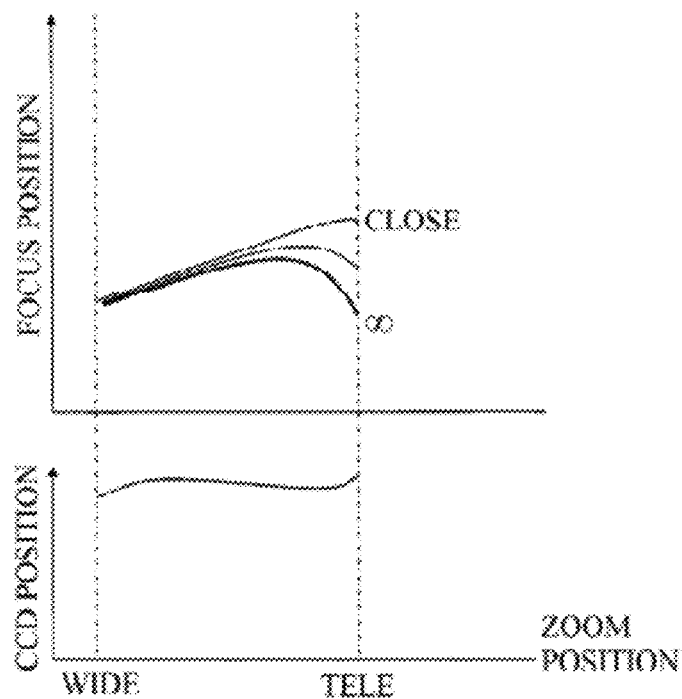
FIG. 4 shows relationships among the zoom position, the focus lens position and the CCD position in the image pickup system of the embodiment, when a second interchangeable lens is used in the image pickup system.

FIG. 4 shows the focus zoom tracking cam data and the CCD zoom tracking cam data when the interchangeable lens unit 125 attached to the camera 124 is a second interchangeable lens unit that is a different model (for example, a focal length or the like is different) from the first interchangeable lens unit. The focus zoom tracking cam data and the CCD zoom tracking cam data shown in FIG. 4 are data corresponding (unique) to the second interchangeable lens unit, which are different data from those corresponding (unique) to the first interchangeable lens unit. In addition, the CCD zoom tracking cam data is data corresponding (unique) to a combination of the second interchangeable lens unit and the camera 124.

Figure 5:
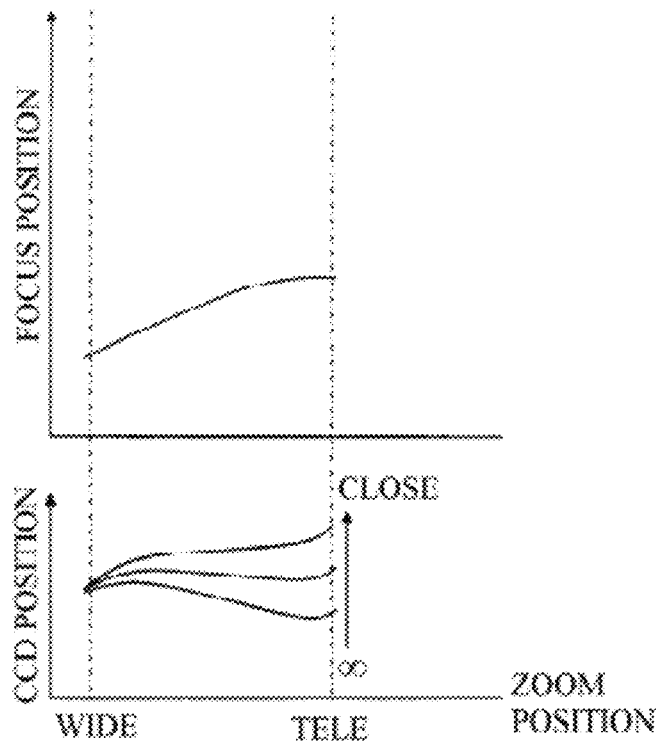
FIG. 5 shows relationships among the zoom position, the focus lens position and the CCD position in the image pickup system of the embodiment, when a third interchangeable lens is used in the image pickup system.

FIG. 5 shows the focus zoom tracking cam data and the CCD zoom tracking cam data when the interchangeable lens unit 125 attached to the camera 124 is a third interchangeable lens unit that is a different model from the first and second interchangeable lens units. The focus zoom tracking cam data shown in FIG. 5 is data corresponding (unique) to the third interchangeable lens unit, which is data for changing the focus position according only to the zoom position (focal length) regardless of the object distance. Moreover, the CCD zoom tracking cam data shown in FIG. 5 is data corresponding (unique) to the third interchangeable lens unit, which is data for changing the CCD position according to the zoom position and the object distance (that is, the in-focus position). The CCD zoom tracking cam data is also data corresponding (unique) to a combination of the third interchangeable lens unit and the camera 124.

The lens microcomputer 120 stores (memories), in its internal memory 120a, the focus zoom tracking cam data. Actually, the lens microcomputer 120 stores plural representative zoom positions and plural focus positions corresponding to the plural representative zoom positions in the internal memory 120a. The lens microcomputer 120 moves the focus lens 106, when the zoom position detected by the zoom position detector is any one of the representative zoom positions, to the focus position corresponding to the detected zoom position (representative zoom position). On the other hand, when the zoom position detected by the zoom position detector is not any of the representative zoom positions, the lens microcomputer 120 calculates a focus position by interpolation calculation using two focus positions corresponding to two representative zoom positions near the detected zoom position, and then moves the focus lens 106 to the calculated focus position.

Moreover, the lens microcomputer 120 sends, in response to attachment of the interchangeable lens 125 to the camera 124, the CCD zoom tracking cam data that has been prestored (memorized) in the internal memory 120a and corresponds to the interchangeable lens unit 125, to the camera microcomputer 121.

The camera microcomputer 121 stores the received CCD zoom tracking cam data in an internal nonvolatile memory 110 installed in the camera 124. The CCD zoom tracking cam data corresponding to the interchangeable lens unit 125 that has been once attached to the camera 124 is saved in the internal nonvolatile memory 110 even after the interchangeable lens unit 125 is detached.

Regarding the CCD zoom tracking cam data, the camera microcomputer 121 actually stores (saves) plural representative zoom positions and plural CCD positions corresponding to the plural representative zoom positions in the internal nonvolatile memory 110. The camera microcomputer 121 moves the CCD 107, when the zoom position detected by the zoom position detector and sent from the lens microcomputer 120 is any one of the representative zoom positions, to the CCD position corresponding to the detected zoom position (representative zoom position). On the other hand, when the zoom position detected by the zoom position detector is not any of the representative zoom positions, the camera microcomputer 121 calculates a CCD position by interpolation calculation using two CCD positions corresponding to two representative zoom positions near the detected zoom position, and then moves the CCD 107 to the calculated CCD position.

Figure 6:
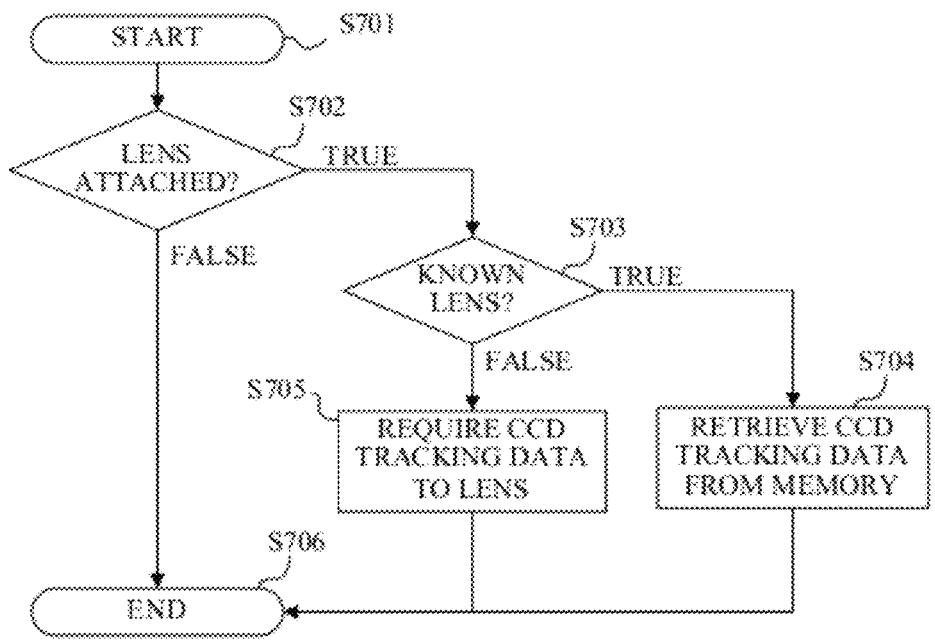
FIG. 6 is a flowchart showing a process performed in the image pickup system of the embodiment.

FIG. 6 is a flowchart showing a process for setting the CCD zoom tracking cam data, which is performed by the camera microcomputer 121 according to a computer program when the interchangeable lens unit 125 is attached to the camera 124.

At step S701, the camera microcomputer 121 starts the process in response to power-on of the camera 124. Next at step S702, the camera microcomputer 121 detects whether or not the interchangeable lens unit 125 is attached to the camera 124 through a mechanical switch (not shown) or sending and receiving of electrical signals to and from the interchangeable lens unit 125. If the interchangeable lens unit 125 is attached to the camera 124, the camera microcomputer 121 proceeds to step S703 to acquires, from the lens microcomputer 120, identification information of the interchangeable lens unit 125 (information unique to the interchangeable lens unit 125 such as a model number or a production number). Then, the camera microcomputer 121 determines, with reference to the identification information, whether or not the interchangeable lens unit 125 has been attached in the past (whether or not the interchangeable lens unit 125 is a known interchangeable lens unit), in other words, whether or not the CCD zoom tracking cam data for the interchangeable lens unit 125 (that is, the CCD zoom tracking cam data corresponding to the identification information of the interchangeable lens unit 125) is stored in the nonvolatile memory 110.

If the CCD zoom tracking cam data for the interchangeable lens unit 125 is stored in the nonvolatile memory 110, the camera microcomputer 121 proceeds to step S704. At step S704, the camera microcomputer 121 retrieves, from the nonvolatile memory 110, the CCD zoom tracking cam data (abbreviated as "CCD tracking data" in the figure) corresponding to the identification information of the interchangeable lens unit 125, and sets it as CCD zoom tracking cam data to be used.

On the other hand, if the CCD zoom tracking cam data for the interchangeable lens unit 125 is not stored in the nonvolatile memory 110 (that is, the interchangeable lens unit 125 is attached for the first time), the camera microcomputer 121 proceeds to step S705. At step S705, the camera microcomputer 121 requires the lens microcomputer 120 to send the CCD zoom tracking cam data for the interchangeable lens unit 125. Then, the camera microcomputer 121 sets the CCD zoom tracking cam data sent from the lens microcomputer 120 as CCD zoom tracking cam data to be used, and stores that CCD zoom tracking cam data in the nonvolatile memory 110 as data corresponding to the identification information of the interchangeable lens unit 125.

At step S706, the camera microcomputer 121 ends the process for setting the CCD zoom tracking cam data. Thereafter, the camera microcomputer 121 performs the movement control of the CCD 107 for the CCD zoom tracking by using the set CCD zoom tracking cam data.

Figure 7:
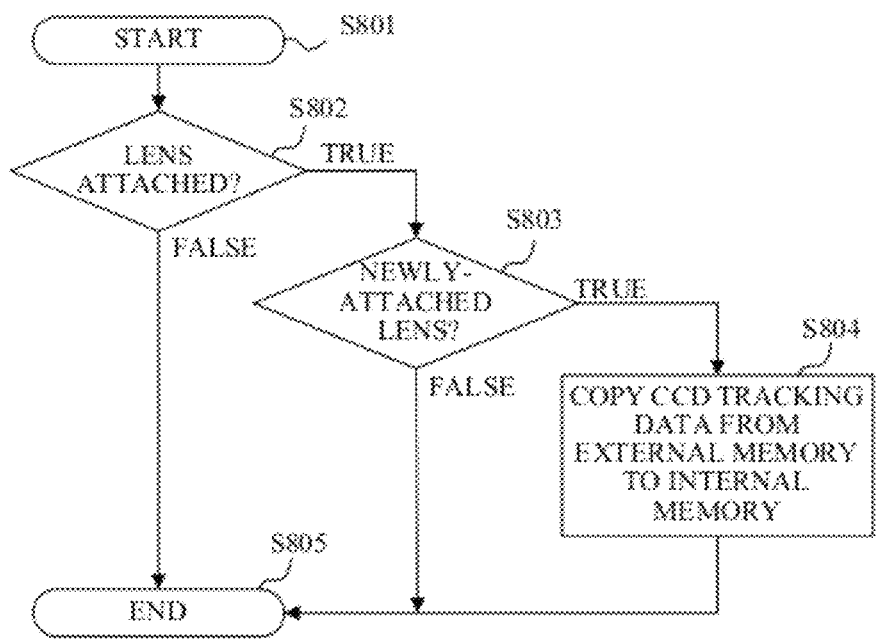
FIG. 7 is a flowchart showing another process performed in the image pickup system of the embodiment.

FIG. 6 shows the process in which, when the interchangeable lens unit 125 is newly attached to the camera 124 (this interchangeable lens unit 125 is hereinafter referred to as a "newly-attached lens unit"), the camera microcomputer 121 acquires the CCD zoom tracking cam data from the newly-attached lens unit. However, as another method for acquiring the CCD zoom tracking cam data of the newly-attached lens unit, the camera microcomputer 121 may retrieve that CCD zoom tracking cam data from an external nonvolatile memory 111 prestoring it and being connected to the camera 124 as shown in FIG. 1. FIG. 7 is a flowchart showing a process for storing the CCD zoom tracking cam data, which is performed by the camera microcomputer 121.

At step S801, the camera microcomputer 121 starts the process in response to power-on of the camera 124. Next at step S802, the camera microcomputer 121 detects whether or not the interchangeable lens unit 125 is attached to the camera 124 through a mechanical switch (not shown) or sending and receiving of electrical signals to and from the interchangeable lens unit 125. If the interchangeable lens unit 125 is attached to the camera 124, the camera microcomputer 121 proceeds to step S803 to acquire, from the lens microcomputer 120, identification information of the interchangeable lens unit 125. Then, the camera microcomputer 121 determines, with reference to the identification information, whether or not the interchangeable lens unit 125 is a newly-attached lens unit.

If the interchangeable lens unit 125 is not a newly-attached lens unit (that is, the interchangeable lens unit 125 has been attached in the past), the camera microcomputer 121 proceeds to step S805 to end this storing process.

On the other hand, if the interchangeable lens unit 125 is a newly-attached lens unit, the camera microcomputer 121 proceeds to step S804. At step S804, the camera microcomputer 121 retrieves the CCD zoom tracking cam data for the newly-attached lens unit from the external nonvolatile memory 111 connected to the camera 124, and stores it in the internal nonvolatile memory 110. Then, the camera microcomputer 121 ends the storing process at step S805.

With this process, the camera microcomputer 121 can acquire the CCD zoom tracking cam data for the newly-attached lens unit even when the newly-attached lens unit for which the CCD zoom tracking cam data is not stored in the internal nonvolatile memory 110 is attached to the camera 124. Thereafter, the camera microcomputer 121 performs the movement control of the CCD 107 for the CCD zoom tracking by using the set CCD zoom tracking cam data for the newly-attached lens unit.

As described above, this embodiment enables appropriate movement control of the CCD 107 for the zoom tracking even when various interchangeable lens units are selectively attached to the camera 124, which enables zooming while sufficiently maintaining an in-focus state.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-183935, filed on Aug. 19, 2010, which is hereby incorporated by reference herein in its entirety.

What is claimed is:

1. An image pickup system including a camera and an interchangeable lens to be detachably attached to the camera, the interchangeable lens having an image-taking optical system that includes a magnification-varying lens being moved in an optical axis direction to perform variation of magnification and a compensating lens being moved in the optical axis direction to reduce focus variation caused due to the variation of magnification, wherein the camera comprising:

an image sensor configured to photoelectrically convert an object image formed by the image-taking optical system;

an image sensor driver configured to move the image sensor in the optical axis direction; and a camera controller configured to control movement of the image sensor through the image sensor driver such that the focus variation caused due to the variation of magnification of the image-taking optical system is reduced, wherein the camera controller is configured to acquire image sensor moving data corresponding to the interchangeable lens attached to the camera, and controls the movement of the image sensor by using the image sensor moving data, wherein a trajectory where the image sensor moves in zooming is satisfied by the image sensor moving data, and the trajectory is different from those of the magnification-varying lens and the compensating lens.

2. An image pickup system according to claim 1, wherein the camera controller is configured to acquire the image sensor moving data corresponding to the interchangeable lens attached to the camera, from that interchangeable lens through communication therewith.

3. An image pickup system according to claim 1, wherein a memory that stores the image sensor moving data corresponding to the interchangeable lens attached to the camera is installed in or removably connected to the camera, and wherein the camera controller is configured to acquire, from the memory, the image sensor moving data corresponding to the interchangeable lens attached to the camera.

4. An image pickup system according to claim 1, wherein the image sensor moving data is position data of the image sensor corresponding to position of the magnification-varying lens or focal length of the image-taking optical system.

5. An image pickup system as claimed in claim 1, wherein the image sensor moving data is position data of the image sensor corresponding to (a) position of the magnification-varying lens or focal length of the image-taking optical system and (b) position of the compensating lens or object distance.

6. An image pickup system including a camera and an interchangeable lens to be detachably attached to the camera, the interchangeable lens having an image-taking optical system that includes a magnification-varying lens being moved in an optical axis direction to perform variation of magnification and a compensating lens being moved in the optical axis direction to reduce focus variation caused due to the variation of magnification,
wherein the camera comprising:
an image sensor configured to photoelectrically convert an object image formed by the image-taking optical system;
an image sensor driver configured to move the image sensor in the optical axis direction; and
a camera controller configured to control movement of the image sensor through the image sensor driver such that the focus variation caused due to the variation of magnification of the image-taking optical system is reduced,
wherein the camera controller is configured to acquire image sensor moving data corresponding to the interchangeable lens attached to the camera, and controls the movement of the image sensor by using the image sensor moving data, and
wherein the image sensor moving data is position data of the image sensor corresponding to (a) position of the magnification-varying lens or focal length of the image-taking optical system and (b) position of the compensating lens or object distance.

7. An image pickup system according to claim 6, wherein the camera controller is configured to acquire the image sensor moving data corresponding to the interchangeable lens attached to the camera, from that interchangeable lens through communication therewith.

8. An image pickup system according to claim 6, wherein a memory that stores the image sensor moving data corresponding to the interchangeable lens attached to the camera is installed in or removably connected to the camera, and
wherein the camera controller is configured to acquire, from the memory, the image sensor moving data corresponding to the interchangeable lens attached to the camera.

9. A camera to which an interchangeable lens is detachably attached, the interchangeable lens having an image-taking optical system that includes a magnification-varying lens being moved in an optical axis direction to perform variation of magnification and a compensating lens being moved in the optical axis direction to reduce focus variation caused due to the variation of magnification, the camera comprising:
an image sensor configured to photoelectrically convert an object image formed by the image-taking optical system;
an image sensor driver configured to move the image sensor in the optical axis direction; and
a camera controller configured to control movement of the image sensor through the image sensor driver such that the focus variation caused due to the variation of magnification of the image-taking optical system is reduced,
wherein the camera controller is configured to acquire image sensor moving data corresponding to the interchangeable lens attached to the camera, and controls the movement of the image sensor by using the image sensor moving data, and
wherein a trajectory where the image sensor moves in zooming is satisfied by the image sensor moving data, and the trajectory is different from those of the magnification-varying lens and the compensating lens.

10. A camera according to claim 9,
wherein the camera controller is configured to acquire the image sensor moving data corresponding to the interchangeable lens attached to the camera, from that interchangeable lens through communication therewith.

11. A camera according to claim 9,
wherein a memory that stores the image sensor moving data corresponding to the interchangeable lens attached to the camera is installed in or removably connected to the camera, and
wherein the camera controller is configured to acquire, from the memory, the image sensor moving data corresponding to the interchangeable lens attached to the camera.

12. A camera as claimed claim 9, wherein the image sensor moving data is position data of the image sensor corresponding to (a) position of the magnification-varying lens or focal length of the image-taking optical system and (b) position of the compensating lens or object distance.

13. An interchangeable lens to be detachably attached to a camera, the interchangeable lens comprising:
an image-taking optical system including a magnification-varying lens being moved in an optical axis direction to perform variation of magnification and a compensating lens being moved in the optical axis direction to reduce focus variation caused due to the variation of magnification,
wherein the camera includes an image sensor configured to photoelectrically convert an object image formed by the image-taking optical system, an image sensor driver configured to move the image sensor in the optical axis direction, and a camera controller configured to control movement of the image sensor through the image sensor driver such that the focus variation caused due to the variation of magnification of the image-taking optical system is reduced by using image sensor moving data corresponding to the interchangeable lens attached to the camera,
wherein the interchangeable lens sends, in response to a requirement from the camera controller, the image sensor moving data corresponding to the interchangeable lens to the camera controller, and
wherein a trajectory where the image sensor moves in zooming is satisfied by the image sensor moving data, and the trajectory is different from those of the magnification-varying lens and the compensating lens.

14. An interchangeable lens according to claim 13, further comprising:
a memory that stores the image sensor moving data corresponding to the interchangeable lens.

15. An interchangeable lens in claim 13, wherein the image sensor moving data is position data of the image sensor corresponding to (a) position of the magnification-varying lens or focal length of the image-taking optical system and (b) position of the compensating lens or object distance.

* * * * *